(12) United States Patent
Fukuyama et al.

(10) Patent No.: US 8,775,612 B2
(45) Date of Patent: Jul. 8, 2014

(54) INSTRUCTION SYSTEM, METHOD, AND RECORDING CONTROL APPARATUS

(75) Inventors: Noriyuki Fukuyama, Kawasaki (JP); Masanobu Morinaga, Kawasaki (JP); Takeshi Kinoshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 301 days.

(21) Appl. No.: 13/251,729

(22) Filed: Oct. 3, 2011

(65) Prior Publication Data

US 2012/0084439 A1 Apr. 5, 2012

(30) Foreign Application Priority Data

Oct. 4, 2010 (JP) ................................. 2010-225249

(51) Int. Cl.
*G06F 15/173* (2006.01)

(52) U.S. Cl.
USPC ........... 709/224; 709/223; 250/288; 250/282; 250/287

(58) Field of Classification Search
USPC ........................... 709/224, 223; 250/282, 288
See application file for complete search history.

(56) References Cited

U.S. PATENT DOCUMENTS

| | | | | |
|---|---|---|---|---|
| 5,432,520 | A * | 7/1995 | Schneider et al. | 342/357.27 |
| 6,658,961 | B2 * | 12/2003 | Lee | 74/473.3 |
| 6,882,681 | B2 * | 4/2005 | Sano | 375/148 |
| 6,940,065 | B2 * | 9/2005 | Graber et al. | 250/282 |
| 6,953,928 | B2 * | 10/2005 | Vestal et al. | 250/287 |
| 6,989,721 | B2 * | 1/2006 | Toda et al. | 333/17.3 |
| 7,093,011 | B2 * | 8/2006 | Hirata et al. | 709/223 |
| 7,109,480 | B2 * | 9/2006 | Vestal et al. | 250/288 |
| 7,176,454 | B2 * | 2/2007 | Hayden et al. | 250/288 |
| 7,265,368 | B2 * | 9/2007 | Martin, III | 250/492.3 |
| 7,346,439 | B2 * | 3/2008 | Bodin | 701/36 |
| 7,351,959 | B2 * | 4/2008 | Hayden et al. | 250/288 |
| 7,380,433 | B2 * | 6/2008 | Seethaler et al. | 73/1.79 |
| 7,385,186 | B2 * | 6/2008 | Hayden et al. | 250/282 |
| 7,405,396 | B2 * | 7/2008 | Cygan et al. | 250/288 |
| 7,415,081 | B2 * | 8/2008 | Shinoda et al. | 375/343 |
| 7,577,167 | B2 * | 8/2009 | Kikuchi et al. | 370/508 |
| 2007/0214257 | A1 * | 9/2007 | Kurita | 709/224 |
| 2010/0020708 | A1 * | 1/2010 | Okada et al. | 370/252 |

FOREIGN PATENT DOCUMENTS

| | | |
|---|---|---|
| JP | 10-190737 | 7/1998 |
| JP | 11-205386 | 7/1999 |

(Continued)

OTHER PUBLICATIONS

Japanese Office Action issued May 7, 2014 in corresponding Japanese Patent Application No. 2010-225249.

*Primary Examiner* — Tammy Nguyen
(74) *Attorney, Agent, or Firm* — Staas & Halsey LLP

(57) ABSTRACT

A system including a first apparatus including a first processor, a first storage device, and a first communication interface and a second apparatus including a second processor and a second communication interface is provided. The first processor measures traffic of data communicated via a predetermined communication path in each of a plurality of time ranges, stores the data communicated in each of the plurality of time ranges in the first storage device, and performs a control processing to cause the first communication interface to transmit the measured data traffic to the second apparatus, and when the second processor receives the measured data, the second processor performs control processing to cause the second communication interface to transmit to the first apparatus designation information designating one of the plurality of time ranges in which protection target data not to be deleted from the first storage device has been communicated.

6 Claims, 18 Drawing Sheets

(56) References Cited

FOREIGN PATENT DOCUMENTS

| | | |
|---|---|---|
| JP | 2007-241805 | 9/2007 |
| JP | 2008-244635 | 10/2008 |
| JP | 2010-34721 | 2/2010 |
| JP | 2010-213143 | 9/2010 |

* cited by examiner

FIG. 12

| GROUP | DATA TRAFFIC |
|---|---|
| S1 | V1 |
| S2 | V2 |
| S3 | V3 |
| ⋮ | ⋮ |
| S16 | V16 |

FIG. 16

| GROUP | VALUE (P) |
|---|---|
| S1 | 0~999 |
| S2 | 1000~4999 |
| S3 | 5000~9999 |
| ... | ... |
| S16 | 10000000~ |

FIG. 17

| STORAGE ADDRESS | FLAG |
|---|---|
| Aa | 1 |
| Ab | 0 |
| ⋮ | ⋮ |

FIG. 18

| STORAGE ADDRESS | TIME RANGE | DATA TRAFFIC |
|---|---|---|
| Aa | T1 | V1 |
| Ab | T2 | V2 |
| ⋮ | ⋮ | ⋮ |

INSTRUCTION SYSTEM, METHOD, AND RECORDING CONTROL APPARATUS

CROSS-REFERENCE TO RELATED APPLICATIONS

This application is based upon and claims the benefit of priority of the prior Japanese Patent Application No. 2010-225249, filed on Oct. 4, 2010, the entire contents of which are incorporated herein by reference.

FIELD

The embodiments disclosed herein are related to processing(s) of communication data and measuring of data traffic.

BACKGROUND

There exists a typical technique for capturing data transmitted on a communication path and measuring the traffic of captured data.

In some cases, a communication service provider charges users on an as-used basis. For example, accounting data obtained by measurement performed on a user's terminal is transmitted to a server of a service provider, and data of the user's terminal is updated on the basis of the accounting data in the server.

A technique for setting a capturing start time and a capturing end time and intermittently performing capturing from the capturing start time by receiving packets at every capturing cycle having a capturing width and a technique for acquiring packets mirrored from packets flowing in each client-server segment or each server-server segment are provided.

SUMMARY

According to an aspect of the invention, a system including a first apparatus and a second apparatus is provided. A first processor of the first apparatus measures traffic of data communicated via a predetermined communication path in each of a plurality of time ranges, stores the data communicated in each of the plurality of time ranges in a first storage device, and performs a control processing to cause a first communication interface of the first apparatus to transmit a notification about the measured data traffic to the second apparatus. And when a second processor of the second apparatus receives the notification from the first apparatus, the second processor performs a control processing to cause the second communication interface of the second apparatus to transmit to the first apparatus information designating one of the plurality of time ranges in which protection of a target data not to be deleted from the first storage device has been communicated.

Objects and advantages of the invention will be realized and attained by at least the elements, features, and combinations particularly pointed out in the claims.

It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 12 is a diagram illustrating an exemplary format in which data is stored in a storage unit.

FIG. 16 is a diagram illustrating an example of a relationship between a selected group and a sum of pieces of data traffic.

FIG. 17 is a diagram illustrating a table for managing a storage address of a storage area in which communication data is stored.

FIG. 18 is a diagram illustrating a table for managing a storage area in which communication data acquired in a time range is stored and data traffic of the acquired communication data.

DETAILED DESCRIPTION

Figure 1:
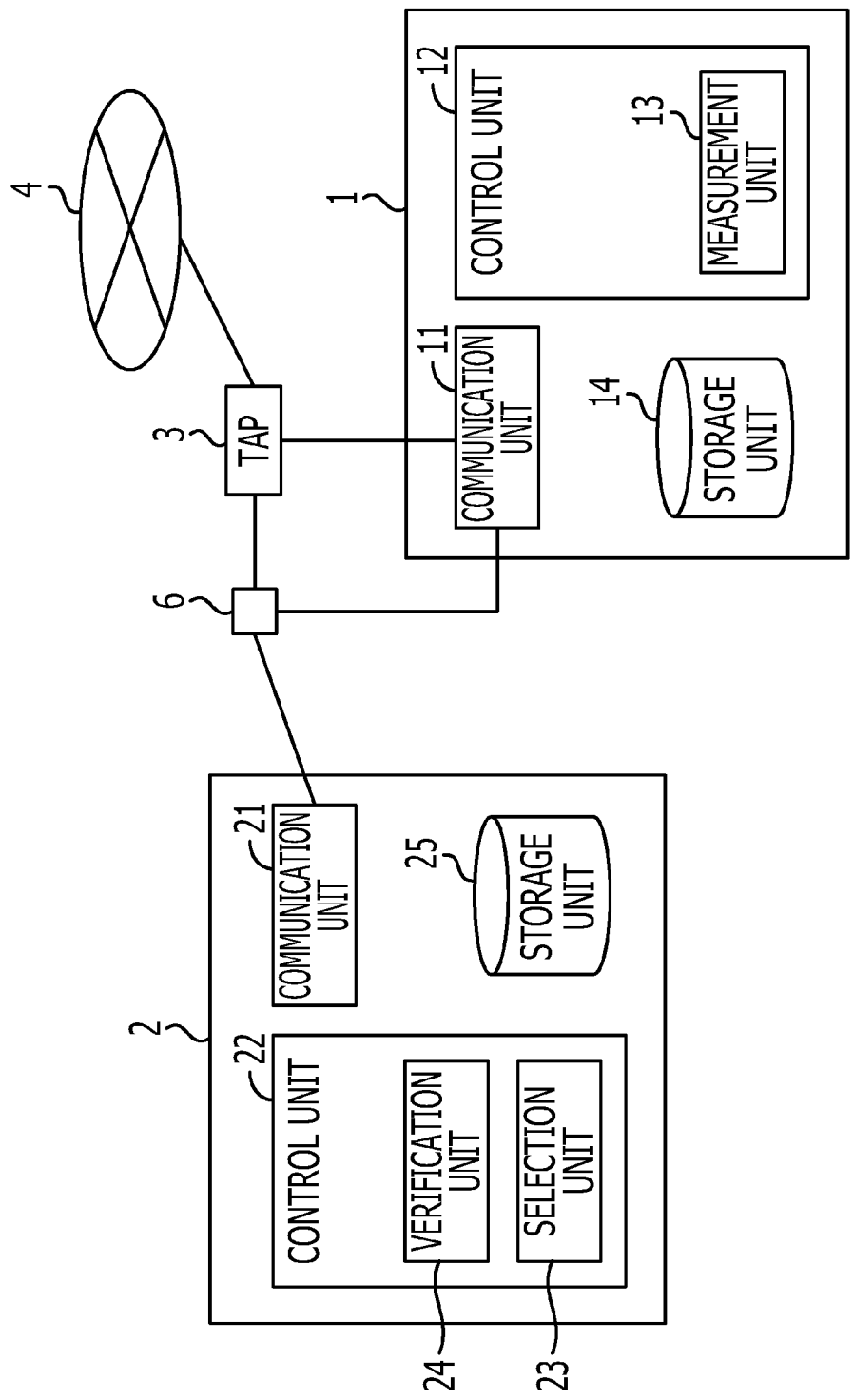
FIG. 1 is a diagram illustrating a configuration of a measurement system according to an embodiment.

Reference will now be made in detail to the embodiments, examples of which are illustrated in the accompanying drawings, wherein like reference numerals refer to the like elements throughout. The embodiments are described below to explain the present invention by referring to the figures.

Embodiments of the present invention will be described with reference to the accompanying drawings. It should be noted that embodiments to be described later do not limit the scope of the present invention.

FIG. 1 is a diagram illustrating a configuration of a measurement system according to an embodiment. A measurement system according to an embodiment includes a first apparatus 1, a second apparatus 2, a network tap 3, a network 4, and a relay apparatus 6.

According to an embodiment, the first apparatus 1 is an apparatus for measuring data traffic of communication performed by the second apparatus 2 via the network 4. The network tap 3 is placed on a communication path between the second apparatus 2 and the network 4, and is an apparatus for causing a data signal communicated by the second apparatus 2 via the network 4 to branch off and transmitting the branched data signal to the first apparatus 1. The relay apparatus 6 is an apparatus for relaying communication between apparatuses connected thereto.

The first apparatus 1 includes a communication unit 11, a control unit 12, a measurement unit 13, and a storage unit 14.

The communication unit 11 transmits data to the relay apparatus 6 under the control of the control unit 12, for example. The communication unit 11 also transmits data received via the network tap 3 or the relay apparatus 6 to the control unit 12. The control unit 12 controls the communication unit 11, the measurement unit 13, and the storage unit 14. The measurement unit 13 measures the traffic of data acquired by the control unit 12 in each of time ranges (T1 to Tn) separated by predetermined time intervals T. The storage unit 14 stores the data acquired by the control unit 12 in each of the time ranges (T1 to Tn).

For example, the time ranges (T1 to Tn) are obtained by separating a period from a time t1 at which measurement of communication data is started into predetermined time intervals T set in advance. In this case, a time range T1 is a range of t1≤a time t<t1+T, and a time range T2 is a range of t1+T the time t<t1+2×T.

The predetermined time interval T and the predetermined number n are set in advance when a measurement of communication data traffic is performed. The setting of the predetermined time interval T and the predetermined number n may be performed on the basis of information input by an input device (including a keyboard 1j and a mouse 1k illustrated in FIG. 10) in the first apparatus 1, or information received from another apparatus via the network 4. A predetermined time interval T may depend on various data including but not limited to a type of communication and/or system, a need of user(s), a path used for communication, etc.

A predetermined number n of the time ranges separated by the predetermined time intervals T are set to a single processing unit. For example, time ranges of t1≤the time t<t1+n×T are set to a processing unit r1, and time ranges of t1+n×T≤the time t<t1+2×n×T are set to a processing unit r2.

Processing for measuring communication data traffic in each of time ranges (T1 to Tn) included in the processing unit r1 and processing for storing communication data in the time ranges (T1 to Tn) included in the processing unit r1 is described below in detail.

Figure 17:
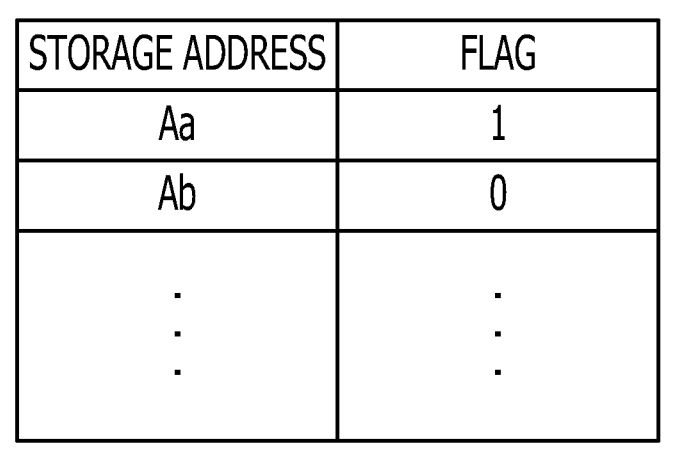

The control unit 12 stores a table B1 including storage addresses of storage locations in a plurality of storage areas in the storage unit 14 in advance (see FIG. 17). The table B1 may include a field for a flag indicating whether data is stored at each storage location. In addition, the control unit 12 stores a table B2 including fields for an address of a storage location at which acquired communication data is stored, information about a time range in which the stored communication data has been acquired, and the traffic of the communication data measured in a time range (see FIG. 18). The control unit 12 controls the communication unit 11 to cause the communication unit 11 to notify the second apparatus 2 of the number n set in advance. While various field content of the tables are described herein, the present invention is not limited to any particular content in the table and may include any communication related data that enables measurement as described herein.

An example of a processing performed when data a is acquired in the time range T1 and data b is acquired in the time range T2 is described below in detail. At the time of start of a measurement processing, the control unit 12 refers to the table B1, reads out a storage address Aa at the top of the table, associates the storage address Aa with information about the time range T1, and stores them in the table B2. Furthermore, the control unit 12 clears a counter for counting up pieces of data traffic.

Data traffic measurement processing is started (at the time t1). The control unit 12 successively acquires time information from a clock 1i (described in detail below with reference to FIG. 6) and determines whether the predetermined time interval T has elapsed from the time t1.

After acquiring the data a, the control unit 12 measures the traffic of the data a, adds the measured data traffic to the counter, and stores the data a at the storage location represented by the storage address Aa. The measurement of data traffic may be performed by measuring a binary such as a byte or a bit or the number of transmission units such as the number of packets.

When the control unit 12 determines that the predetermined time interval T has elapsed from the time t1, it reads out the value of the counter and stores the read value in the field for communication data traffic in the table B2. This value represents data traffic (V1) in the time range T1. Subsequently, the control unit 12 clears the value of the counter, refers to the table B1 in which storage addresses are ordered, reads out a storage address Ab next to the storage address Aa, associates the storage address Ab with information about a time range T2, and stores them in the table B2.

After acquiring the data b, the control unit 12 measures the traffic of the data b, adds the measured data traffic to the counter, and stores the data b at the storage location represented by the storage address Ab. In an embodiment, an address of measured data traffic is associated with a corresponding time information and a storage location.

By performing the above-described processing, the first apparatus 1 stores pieces of communication data acquired in time ranges at different storage locations.

When the measurement unit 13 measures pieces of data traffic (V1 to Vn) in the predetermined number (n) of time ranges (T1 to Tn), the control unit 12 controls the communication unit 11 to cause the communication unit 11 to transmit to the second apparatus 2 pieces of information about the measured pieces of data traffic (V1 to Vn) in the time ranges and information about the processing unit r1. Alternatively, data that associates data representing the pieces of data traffic (V1 to Vn) in the time ranges (T1 to Tn) and data representing the time ranges (T1 to Tn) with each other may be transmitted.

The second apparatus 2 includes a communication unit 21, a control unit 22, a selection unit 23, a verification unit 24, and a storage unit 25.

The communication unit 21 transmits data to the relay apparatus 6 under the control of the control unit 22, and transmits data received via the relay apparatus 6 to the control unit 22. The control unit 22 controls the communication unit 21, the selection unit 23, the verification unit 24, and the storage unit 25. When the communication unit 21 receives from the first apparatus 1 the pieces of information about the pieces of data traffic (V1 to Vn) measured by the first apparatus 1, the selection unit 23 selects one of the time ranges (T1 to Tn) corresponding to the received pieces of data traffic. Upon receiving a verification instruction, the verification unit 24 verifies measurement performed in the time range selected by the selection unit 23. The verification instruction may be a user's instruction received by an input receiving unit (not illustrated) included in the second apparatus 2 or may be acquired via the network 4.

When the communication unit 21 receives from the first apparatus 1 pieces of data representing the pieces of data traffic (V1 to Vn) (or data that associates data representing the pieces of data traffic (V1 to Vn) and data representing the time ranges (T1 to Tn) with each other), the control unit 22 causes the selection unit 23 to perform a selection processing.

The selection unit 23 selects one (Ts) of the time ranges (T1 to Tn) corresponding to the pieces of data traffic (V1 to Vn) received by the communication unit 21. Since the second apparatus 2 has already been notified of the number n set in advance by the first apparatus 1, the selection unit 23 selects one of n selection targets. For example, the selection unit 23 selects one (an integer value s) of integer values (1 to n).

As a method of selecting a time range, for example, a method of randomly selecting one of integer values (1 to n) in accordance with a predetermined algorithm or a method of calculating one (the integer s) of the integer values (1 to n) by substituting numeric information about a time at which pieces of information about the pieces of data traffic (V1 to Vn) have been received from the first apparatus 1 into a function used to output one of the integer values (1 to n) may be employed. As the method of calculating the integer value s, any method with which the first apparatus 1 cannot expect the integer value s calculated in each processing unit can be employed.

When the second apparatus 2 receives data that associates data representing the pieces of data traffic (V1 to Vn) and data representing the time ranges (T1 to Tn) with each other, data representing a time range corresponding to the selected integer value s (an sth time range in the processing unit r1: Ts) may be generated.

The control unit 22 controls the storage unit 25 and the communication unit 21 to cause the storage unit 25 to store information about the time range selected by the selection unit 23 (for example, pieces of information about the integer value s and the processing unit r1 or information about the time range (Ts)) and to cause the communication unit 21 to transmit the information to the first apparatus 1.

The control unit 12 in the first apparatus 1 performs data storage control on the basis of the information about the time range received from the second apparatus 2. The control unit 12 refers to the table B2, reads out a storage address corresponding to the time range (Ts) represented by the received information, and performs control processing so that data stored at a storage location corresponding to the read storage address cannot be deleted. For example, data stored at a storage location corresponding to the read storage address may be read out and written into another storage area, and the storage area may be managed as an overwriting forbidden area. Alternatively, control processing may be performed for referring to the table B2, reading out storage addresses associated with time ranges other than the time range (Ts) in the processing unit r1, and setting the values of flags for the read storage addresses to zero in the table B1. By changing the values of the flags to zero, storage locations having storage address corresponding to the flags can be set as storage locations at which acquired communication data can be stored.

When the control unit 22 in the second apparatus 2 receives a verification instruction, it causes the verification unit 24 to perform verification processing.

When the verification unit 24 receives an instruction, it generates an acquisition request including information about the time range (Ts) selected by the selection unit 23. The control unit 22 controls the communication unit 21 to cause the communication unit 21 to transmit the acquisition request generated by the verification unit 24 to the first apparatus 1. The verification unit 24 receives data that has been transmitted from the first apparatus 1 in response to the acquisition request, remeasures the traffic of the received data, and compares the remeasured data traffic (Vs') and the data traffic (Vs) that is one of the pieces of data traffic (V1 to Vn) received by the communication unit 21 and corresponds to the selected time range (Ts).

When it is determined that the data traffic (Vs) and the data traffic (Vs') differ from each other, the data that has been acquired in response to the acquisition request is verified. For example, in order to verify the data, a user views the data.

Verification processing is not limited to the above-described processing. For example, the second apparatus 2 may transmit a predetermined packet for authentication each time it transmits a certain amount of data via the network 4, and it may be checked whether the predetermined packet is periodically included in the data that has been transmitted to the second apparatus 2 in response to the acquisition request. As a result, when an apparatus pretending to be the second apparatus 2 performs communication, the spoofing can be found. The predetermined packet may include sequence information, and the sequence information in the predetermined packet included in the data that has been acquired in response to the acquisition request may be checked.

For example, authentication data may be added to data to be communicated by the second apparatus 2 in units of packets or files. For example, when the first apparatus 1 performs communication in accordance with a protocol such as Ipsec in which an authentication header is added to each packet or transmits a file, it encrypts the packet or the file using a cryptographic key secretly managed therein and transmits the packet or the file. In order to verify the packet or the file, authentication data added to the packet or the file is checked.

Figure 2:
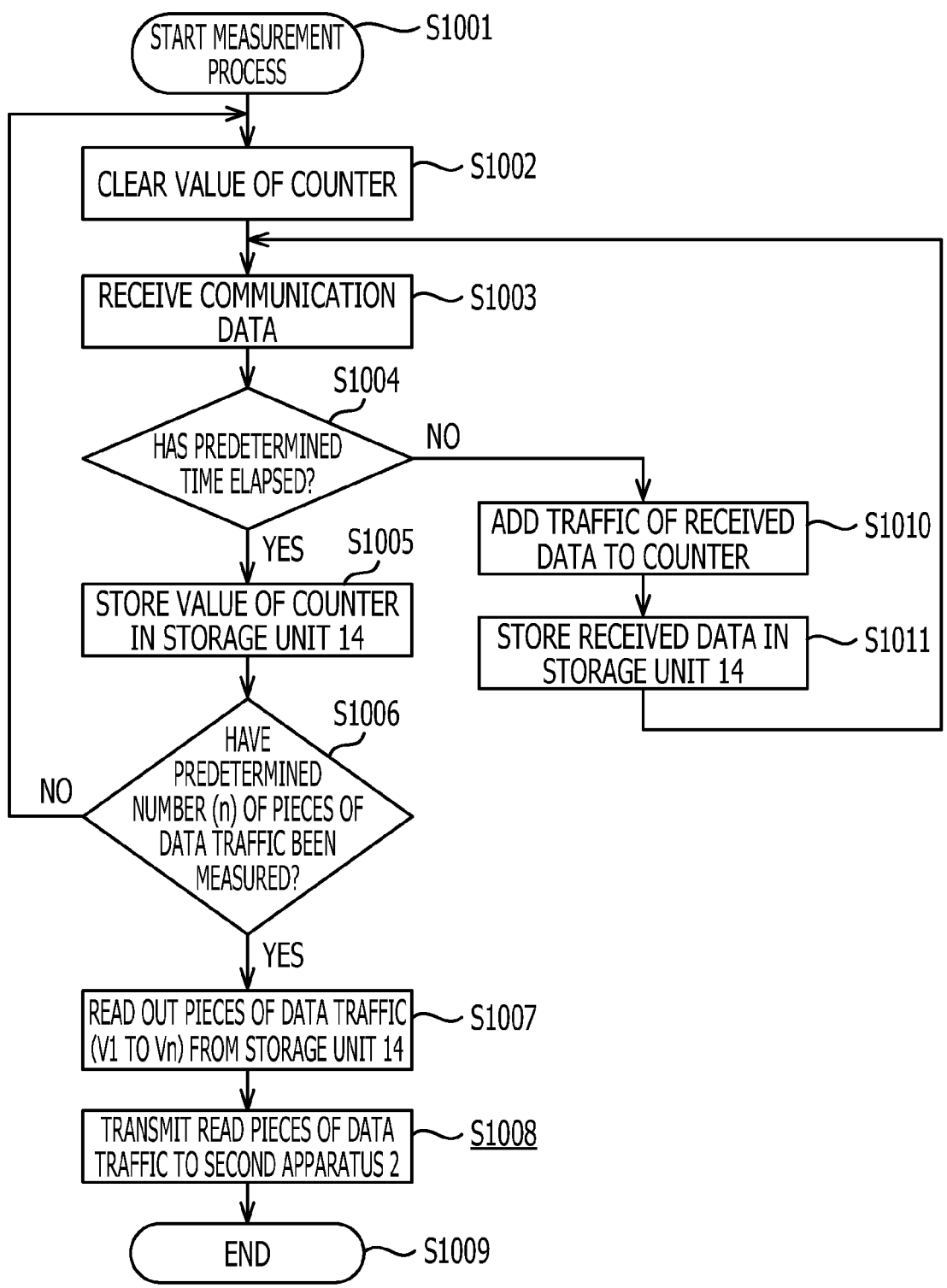
FIG. 2 is a flowchart illustrating a measurement process performed by a first apparatus.

FIG. 2 is a flowchart illustrating a measurement process performed by the first apparatus 1.

When the measurement unit 13 starts the measurement process (S1001), it clears a counter for measuring data traffic (S1002). When the communication unit 11 receives communication data (S1003), the measurement unit 13 determines whether a time corresponding to the length of a single time range (a predetermined time interval) has elapsed (S1004). When it is determined in S1004 that the time has elapsed (YES in S1004), the process proceeds to S1005. When it is determined in S1004 that the time has not elapsed (NO in S1004), the measurement unit 13 measures the traffic of the received communication data and adds the measured data traffic to the counter (S1010) and the control unit 12 causes the storage unit 14 to stores the received communication data (S1011).

When it is determined in S1004 that the time has elapsed (YES in S1004), the control unit 12 causes the storage unit 14 to store a value indicated by the counter as the traffic of the communication data in the time range (S1005). Subsequently, it is determined whether the number of time ranges in which data measurement has been performed reaches a predetermined number (n) (S1006). When it is determined that the number of time ranges does not reach the predetermined number (n), the process returns to S1002 in which the measurement of communication data traffic in the next time range is performed. When it is determined that the number of time ranges reaches the predetermined number (n), the pieces of data traffic (V1 to Vn) stored in the storage unit 14 are read out (S1007) and are then transmitted to the second apparatus 2 (S1008).

Figure 3:
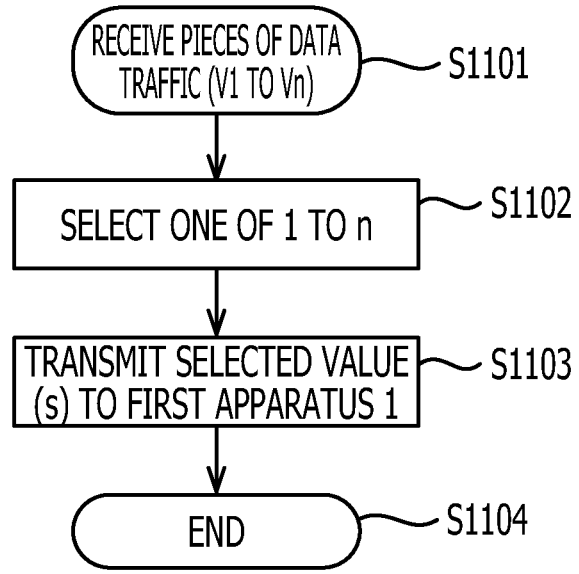
FIG. 3 is a flowchart illustrating a selection process performed by a second apparatus.

FIG. 3 is a flowchart illustrating a selection process performed by the second apparatus 2.

When the communication unit 21 receives pieces of information about the pieces of data traffic (V1 to Vn) transmitted from the first apparatus 1 in S1008, the selection process is started (S1101). When the pieces of information about the pieces of data traffic (V1 to Vn) are received, the selection unit 23 calculates data representing one (s) of 1 to n (S1102). The communication unit 21 transmits the data representing one (s) of 1 to n to the first apparatus 1 (S1103). For example, the selection unit 23 calculates a value indicating one of 1 to n by converting an integer value acquired on the basis of a time (tr) at which the pieces of information about the pieces of data traffic (V1 to Vn) have been received in accordance with a predetermined algorithm.

Figure 4:
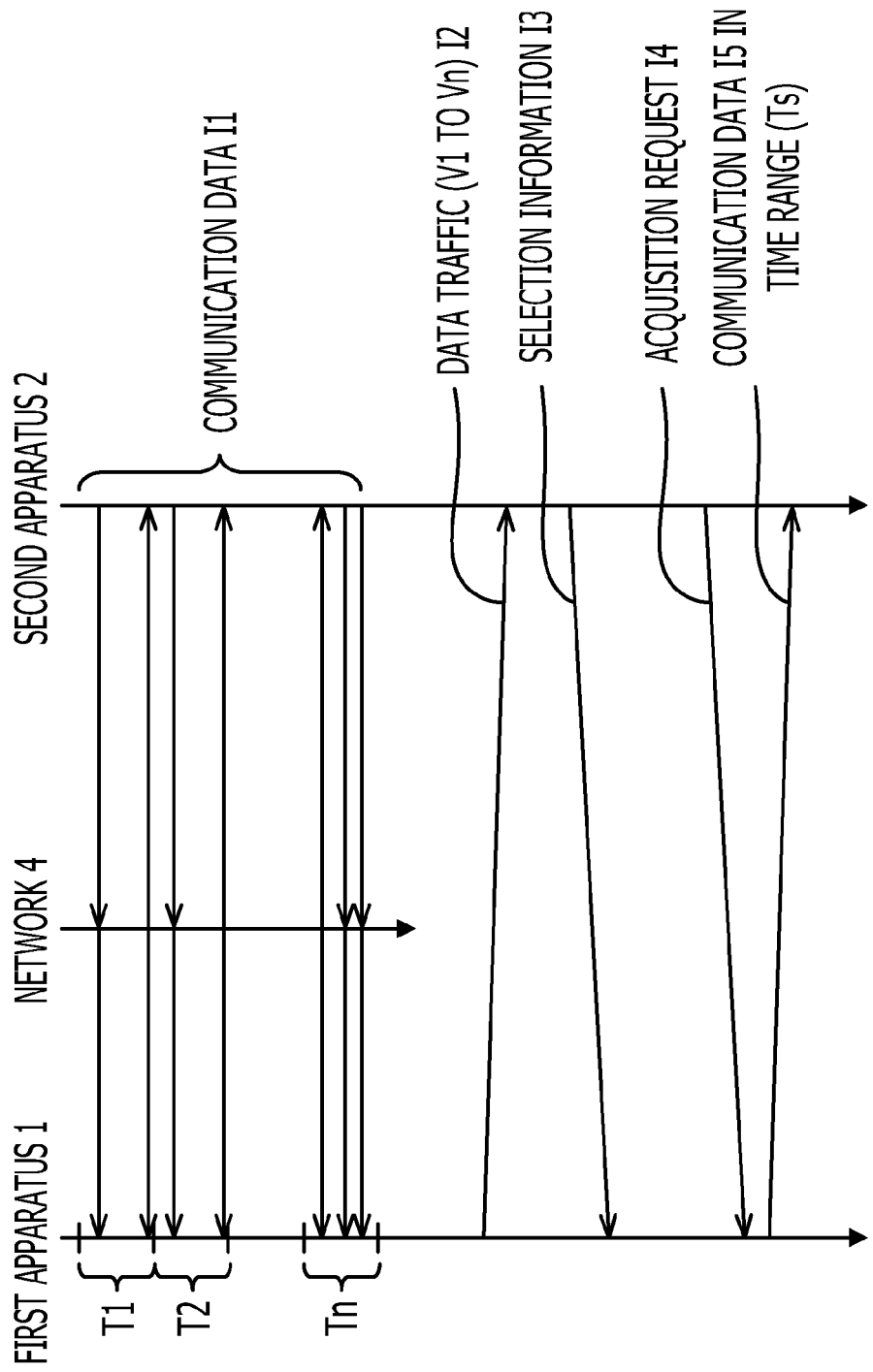
FIG. 4 is a sequence diagram illustrating a process performed between the first apparatus and the second apparatus.

FIG. 4 is a sequence diagram illustrating a process performed between the first apparatus 1 and the second apparatus 2.

First, the first apparatus 1 acquires data (I1) branched off from data transmitted between the second apparatus 2 and the network 4 and performs processing for measuring data traffic in each of time ranges (T1 to Tn). The first apparatus 1 transmits information (I2) about measured data traffic to the second apparatus 2 (S1008). When the second apparatus 2 receives the information (I2), selection processing is started. The second apparatus 2 transmits information about the time range (Ts) selected in the selection processing (selection information I3) to the first apparatus 1, and the first apparatus 1 receives the selection information I3. The control unit 12 performs control processing for setting a storage area in the storage unit 14 in which data acquired in the time range (Ts) represented by the selection information is stored as an overwriting prohibited area so that the storage unit 14 cannot delete the data. The control unit 12 may perform control processing for deleting data other than the data acquired in the time range (Ts) from the storage unit 14 or control processing for setting a storage area in the storage unit 14 in which data other than the data acquired in the time range (Ts) is stored as an overwritable area and reusing the storage area.

The second apparatus 2 transmits a data acquisition request (I4) to the first apparatus 1 in response to a received instruction. The first apparatus 1 receives the data acquisition request (I4), and transmits communication data (I5) acquired in the selected time range (Ts) to the second apparatus 2. The second apparatus 2 performs verification processing on the basis of the communication data acquired in the time range (Ts) and data traffic (Vs).

According to an embodiment, by storing a part of communication data of the second apparatus 2 in the first apparatus 1 and causing the second apparatus 2 to partly verify the communication data stored in the first apparatus 1, mismeasurement performed by the first apparatus 1 can be detected.

In an embodiment, data in the time range (Ts) continuously stored in the first apparatus 1 is selected by the second apparatus 2 after the measured pieces of data traffic (V1 to Vn) have been transmitted to the second apparatus 2. Accordingly, when the first apparatus 1 intentionally pads data traffic in a certain time range and the time range is selected, mismeasurement may be detected. Since the selection of a time range is performed by the second apparatus 2 and the first apparatus 1 cannot determine which of time ranges will be selected in advance, it is impossible to intentionally change data traffic in only an unselected time range. Therefore, it is impossible for the first apparatus 1 to change data traffic while avoiding detection by the second apparatus 2.

The possibility that data read out from the first apparatus 1 in response to an acquisition request may include data other than communication data of the second apparatus 2 can be eliminated as follows. By causing the second apparatus 2 to transmit a predetermined packet each time it transmits a predetermined amount of data and check whether the predetermined packet appears every predetermined amount of data in verification processing, it is possible to find padding of data stored in the first apparatus 1 or communication performed by an apparatus pretending to be the second apparatus 2 via the network 4.

Figure 5:
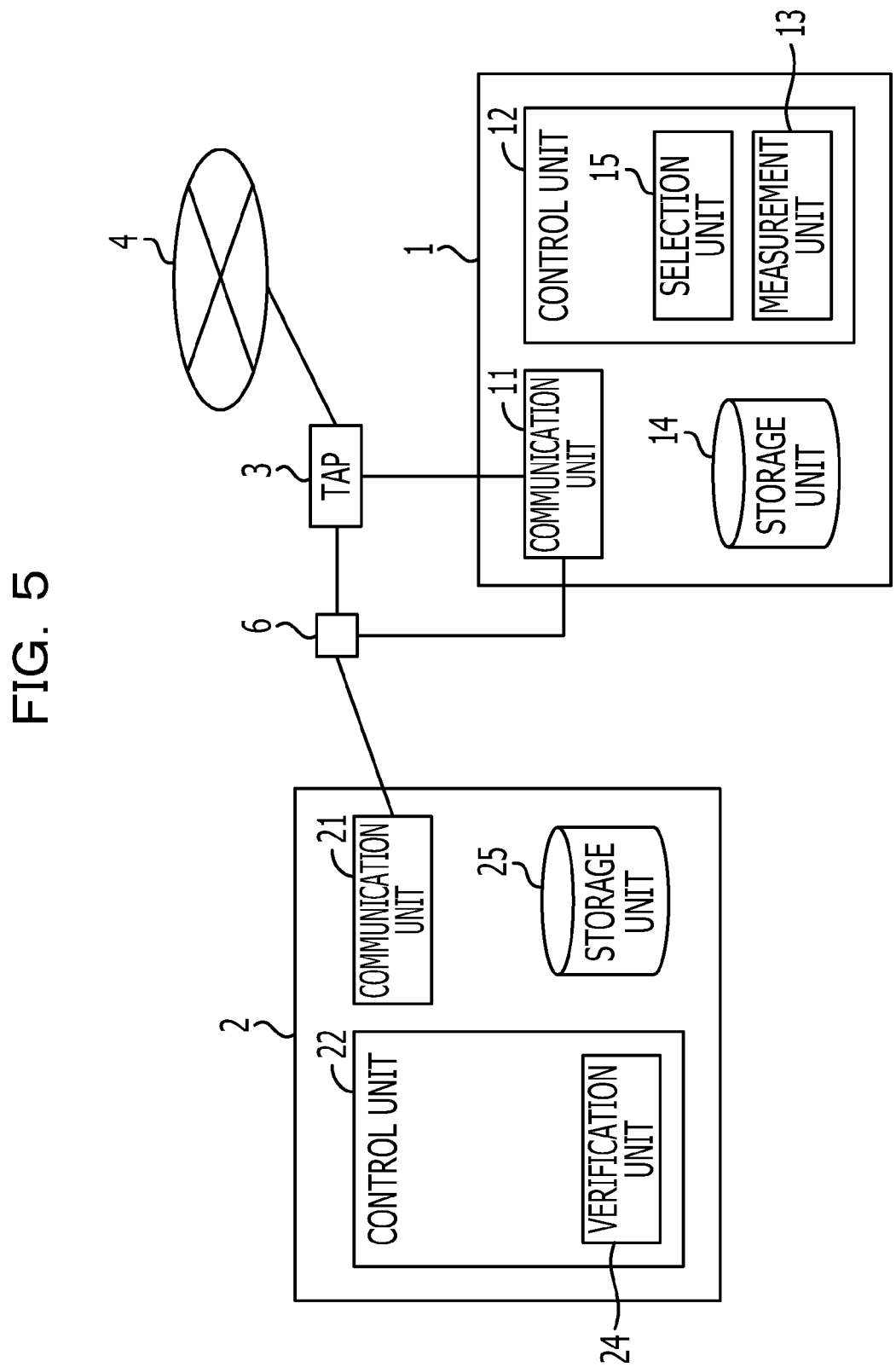
FIG. 5 is a diagram illustrating the configuration of a measurement system according to an embodiment.

FIG. 5 is a diagram illustrating the configuration of a measurement system according to an embodiment. A measurement system according to an embodiment includes a measurement apparatus 1, an information processing apparatus 2, the network tap 3, and the network 4. Like the first apparatus according to the above-described embodiment, the measurement apparatus 1 includes the communication unit 11, the control unit 12, the measurement unit 13, and the storage unit 14. The measurement apparatus 1 further includes a selection unit 15.

The functions of the communication unit 11, the control unit 12, the measurement unit 13, and the storage unit 14 are similar to those described in the above-described embodiment, and are described in detail below. In addition, the function of the selection unit 15 is described in detail.

The communication unit 11 receives a signal from the network tap 3, extracts data from the received signal in transmission units (for example, in units of IP packets or MAC frames) in a predetermined communication protocol, adds information about a time at which the data extraction has been performed (hereinafter referred to as time information) to the extracted data, and transmits them to the control unit 12.

The measurement unit 13 forms a plurality of (n) groups (S1 to Sn) by putting each of pieces of data acquired by the communication unit 11 into one (Si) of the groups (S1 to Sn) and measures pieces of data traffic (V1 to Vn) of the groups (S1 to Sn). Here, n is determined in advance. The control unit 12 causes the storage unit 14 to store data traffic (Vi) of each group (Si) measured by the measurement unit 13.

The group (Si) is, for example, a group of pieces of data acquired by the communication unit 11 in each of time ranges separated by time intervals set in advance. For example, a group (S1) can be considered to be a group of pieces of data acquired in a time range of t1 to t1+T where t1 is a data acquisition start time and T is a time interval used for separation of time ranges. In this case, the group (Si) is a group of pieces of data acquired in a time range of t1+T×(i−1)×T to t1+T×i where i is an integer ranging from 1 to n.

Figure 12:
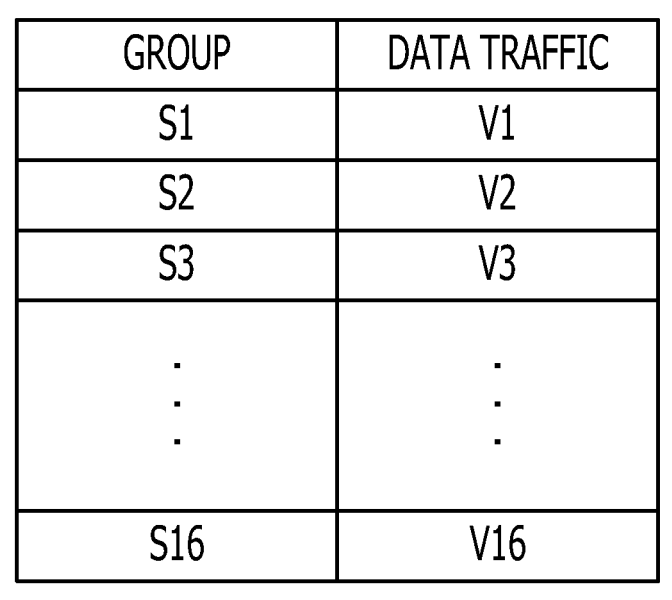

The storage unit 14 stores the data traffic (Vi) measured by the measurement unit 13 and reads out the stored pieces of data traffic (V1 to Vn) in the groups (S1 to Sn) in response to a request transmitted from the control unit 12. The data traffic (Vi) stored in the storage unit 14 is associated with the group (Si) as illustrated in FIG. 12. The storage unit 14 further stores data acquired by the communication unit 11.

When the measurement unit 13 ends the measurement of the pieces of data traffic (V1 to Vn), the control unit 12 causes the communication unit 11 to transmit pieces of information about the measured pieces of data traffic (V1 to Vn) to the information processing apparatus 2. When the communication unit 11 receives response information from the information processing apparatus 2, the control unit 12 transmits the response information and the pieces of data traffic to the selection unit 15 and instructs the selection unit 15 to perform selection processing.

This response information is information indicating that the information processing apparatus 2 has received the pieces of data traffic (V1 to Vn), and includes, for example, information about a time (tr) at which the pieces of data traffic (V1 to Vn) have been received.

The selection unit 15 selects at least one of n groups (groups (S1) to (Sn)) in accordance with a predetermined algorithm by performing processing using the pieces of data traffic (V1 to Vn) and the response information (for example, a receiving time tr) as parameters. The selected group is hereinafter referred to as a group (Ss). This selection processing has reproducibility. That is, when processing is performed using the same parameters (V1 to Vn and tr), the same group (Ss) is selected.

Examples of processing for causing the selection unit 15 to select the group (Ss) include processing for substituting the parameters (V1 to Vn and tr) into a predetermined function, for example, a function with which one of 1 to n is output in accordance with a substituted value, and selecting the group (Ss) on the basis of the function value. For example, selection processing may be performed for substituting into a hash function a result of addition of the sum (Vsum) of the pieces of data traffic (V1 to Vn) and an integer value obtained by converting the receiving time (tr) or a result of addition of a value obtaining by arranging values of the pieces of data traffic (V1 to Vn) each having a predetermined number of digits (see FIG. 15) and an integer value obtained by converting the receiving time (tr) and selecting the group (Ss) corresponding to the obtained hash value.

Alternatively, the selection unit 15 may create in advance a table in which information about each of the groups (S1 to Sn) and the range of a result of addition (Vsum+tr) of the sum (Vsum) of the pieces of data traffic (V1 to Vn) in the groups (S1 to Sn) and the receiving time value (tr) are associated with each other, and select a group associated with a value range including a set value (Vsum+tr) as the group (Ss) (see FIG. 16).

The control unit 12 sets data included in the group (Ss) that is one of the groups (S1 to Sn) to be "not overwritable" and data included in the other groups to be "overwritable" in the storage unit 14 on the basis of information about the group (Ss) selected by the selection unit 15. The data not included in the group (Ss) may be deleted.

It is determined whether data stored in the storage unit 14 is data included in the group (Ss) on the basis of time information added to the data stored in the storage unit 14.

Alternatively, the control unit 12 may acquire time information added to the first data in the group (Ss) and time information added to the last data in the group (Ss) from the selection unit 15 as information about the group (Ss) and read out data included in the group (Ss) on the basis of the acquired pieces of time information. In this case, the measurement unit 13 acquires time information for the first acquired data and time information for the last acquired data in each group (Si), associates these pieces of time information with data traffic (Vi) in the group (Si), and stores them in the storage unit 14. The control unit 12 reads out pieces of time information added to the first data and the last data in each group (Si) from the storage unit 14. The control unit 12 may instruct the storage unit 14 to add a flag indicating that data is not overwritable to data in a range from the time information added to the first data and the time information added to the last data in the group (Ss).

The communication unit 11 communicates with other apparatuses (including the information processing apparatus 2). In response to a reading request from another apparatus, the pieces of data traffic (V1 to Vn) and data included in the group (Ss) are output from the storage unit 14. As illustrated in FIG. 12, the data traffic (Vi) and the group (Si) that are associated with each other are read out from the storage unit 14.

Using the measurement apparatus 1, an apparatus that can communicate with the measurement apparatus 1 can acquire the pieces of data traffic (V1 to Vn) and data from the storage unit 14 via the communication unit 11 and check the pieces of data traffic (V1 to Vn) by two methods.

The first method is a method of causing the information processing apparatus 2 to acquire data included in the group (Ss) from the storage unit 14, measure the traffic of the acquired data, and compare the measured data traffic (Vs') and the data traffic (Vs) of the group (Ss) included in acquired pieces of data traffic (V1 to Vn).

Using this method, before the measurement apparatus 1 performs selection processing, it is possible to detect whether the data traffic (Vs) included in the pieces of data traffic (V1 to Vn) transmitted from the measurement apparatus 1 to the information processing apparatus 2 is a value obtained by mismeasurement.

The second method is a method of causing the information processing apparatus 2 to acquire data included in the group (Ss) from the storage unit 14 and check whether time information added to the acquired data is in the time range of T1+T×(s−1) to T1+T×s.

Using this method, it can be determined whether the measurement apparatus 1 stores data included in the selected group (Ss).

The above-described two types of check processes are performed by the verification unit 24 in the information processing apparatus 2. By performing these check processes, it is possible to detect a change or a falsification made to the pieces of data traffic (V1 to Vn) measured by the measurement apparatus 1.

It is difficult for the measurement apparatus 1 to tamper with the pieces of data traffic (V1 to Vn) while avoiding detection by another apparatus, since the apparatus performs two types of check processes before and after the selection of the group (Ss) performed by the selection unit 15.

Thus, an apparatus that can communicate with the measurement apparatus 1 can detect a change or a falsification. Accordingly, transmitting the pieces of data traffic (V1 to Vn) and data included in the group (Ss) from the measurement apparatus 1 to another apparatus is equivalent to notifying the apparatus of the fact that the measurement apparatus 1 cannot change or tamper with the data traffic (Vi) while avoiding detection by other apparatuses.

Figure 6:
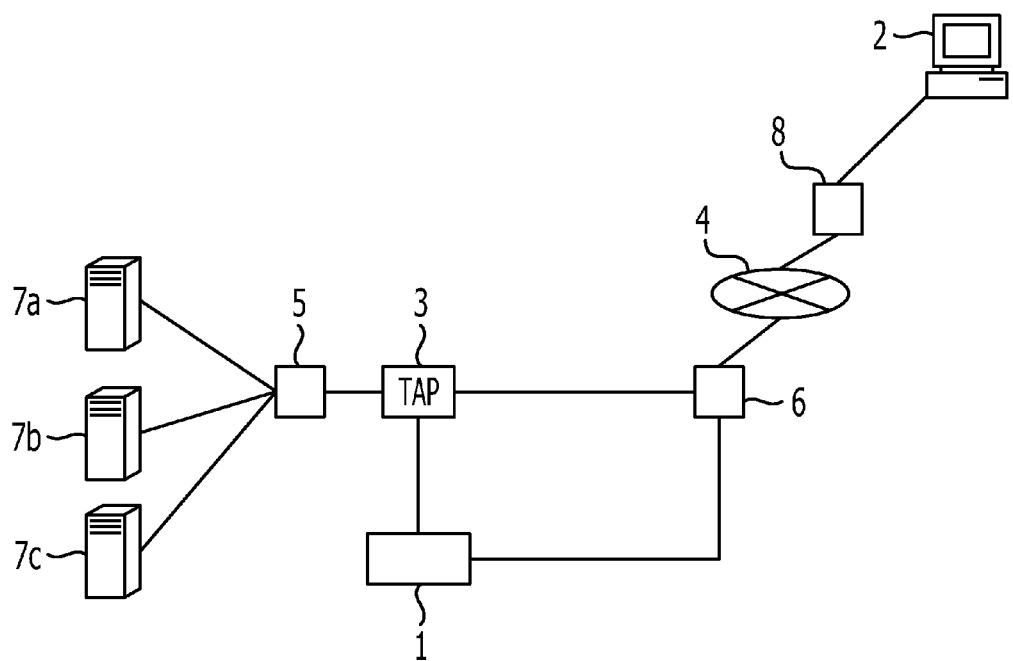
FIG. 6 is a diagram illustrating exemplary layout of a measurement apparatus.
Figure 7:
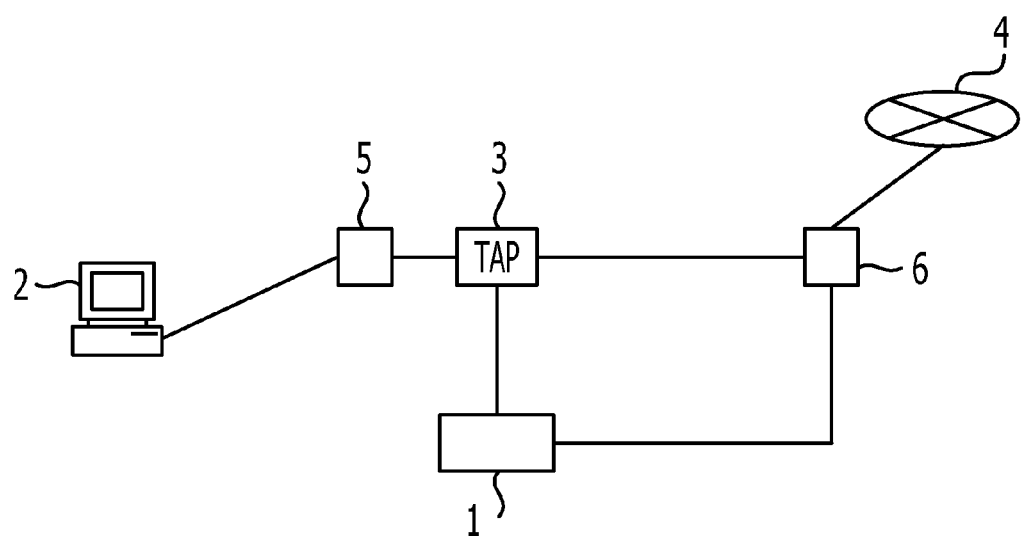
FIG. 7 is a diagram illustrating another exemplary layout of a measurement apparatus.

FIGS. 6 and 7 are diagrams illustrating the exemplary layout of the measurement apparatus 1.

Referring to FIG. 6, server computers 7a, 7b and 7c (7a to 7c) for providing service, the network 4, a relay apparatus 8, and a terminal apparatus 2 are illustrated. The server computers 7a to 7c are connected to a relay apparatus 5. The relay apparatus 6 is connected to the network 4. The terminal apparatus 2 is connected to the network 4 via the relay apparatus 8. The terminal apparatus 2 is, for example, a computer used by a user. When the relay apparatus 8 has the function of a radio station, the terminal apparatus 2 may be a personal digital assistant (PDA) or a mobile telephone.

In the case of the exemplary layout illustrated in FIG. 6, the measurement apparatus 1 measures the traffic of data transmitted from the terminal apparatus 2 to the server computers 7a to 7c. The measurement apparatus 1 can measure the amount of usage of the server computers 7a to 7c by the terminal apparatus 2.

Referring to FIG. 7, the terminal apparatus 2 and the network 4 are illustrated. The terminal apparatus 2 is connected to the relay apparatus 5. The network 4 is connected to the relay apparatus 6.

In the case of the exemplary layout illustrated in FIG. 7, the measurement apparatus 1 measures the traffic of data transmitted from the terminal apparatus 2 via the network 4. Accordingly, the measurement apparatus 1 can measure the amount of usage of the network 4 by the terminal apparatus 2.

The measurement apparatus 1 may measure data traffic of communication performed by a specific apparatus. When the data traffic of communication performed by the terminal apparatus 2 via a path between the relay apparatuses 5 and 6 illustrated in FIGS. 6 and 7 are measured, for example, filtering is performed by causing the communication unit 11 to determine whether a transmission destination address to which acquired data is transmitted or a transmission source address from which acquired data is transmitted is the address of the terminal apparatus 2.

Figure 8:
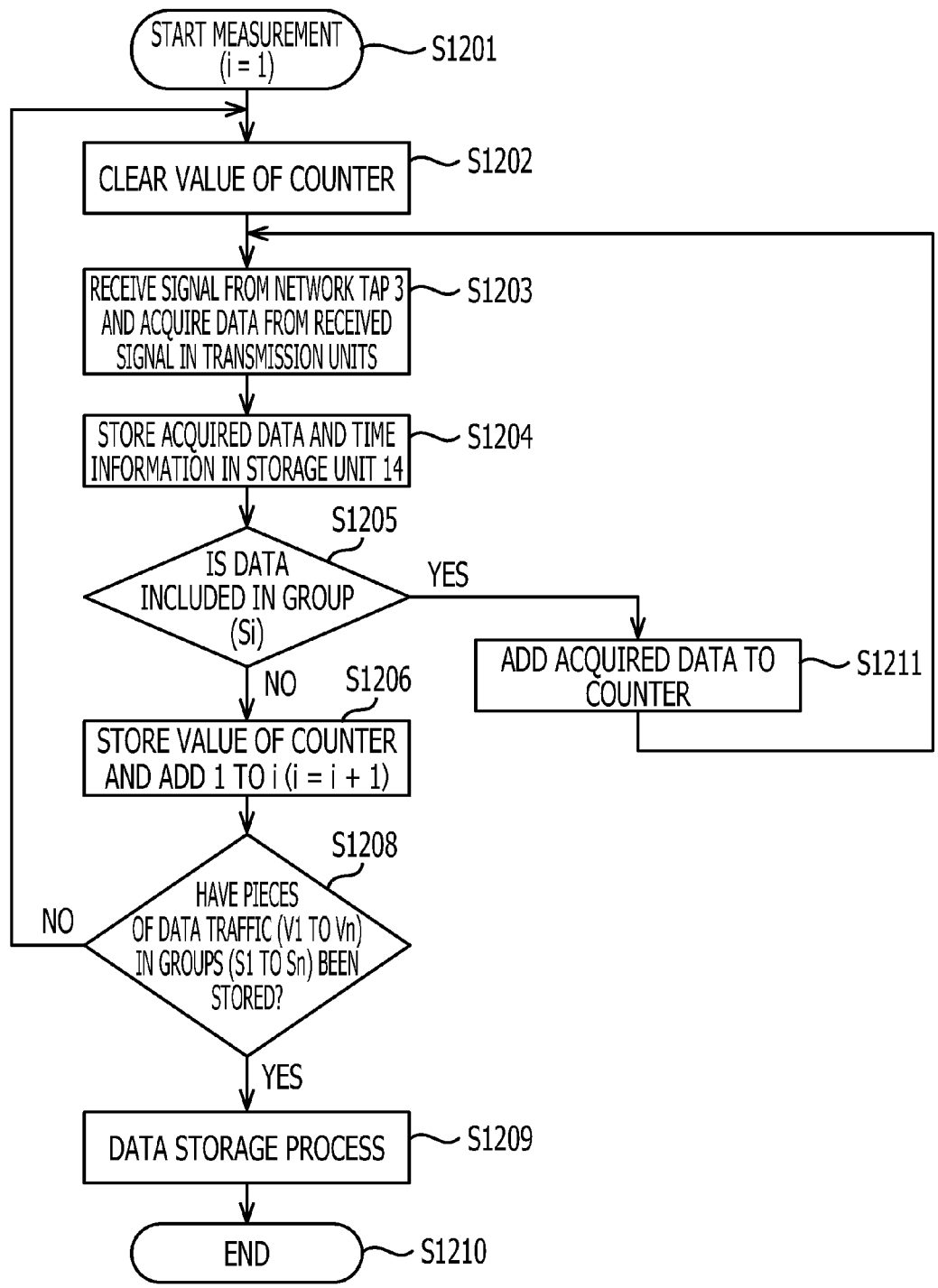
FIG. 8 is a flowchart illustrating a measurement process performed by a measurement apparatus.
Figure 9:
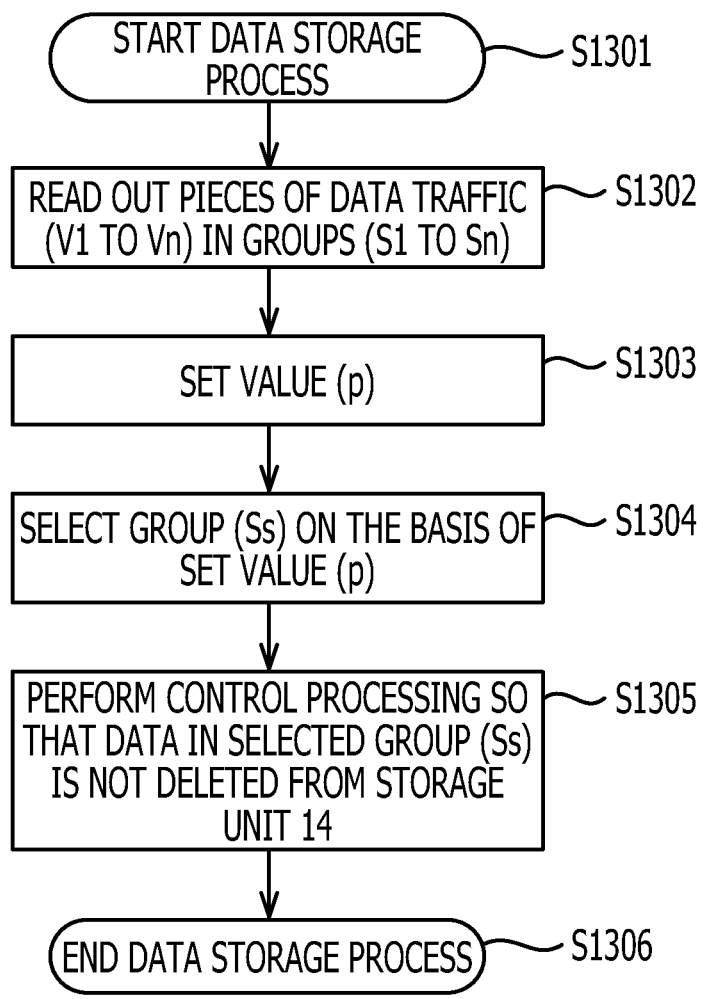
FIG. 9 is a flowchart illustrating a selection process performed by a measurement apparatus.

FIGS. 8 and 9 are flowcharts illustrating a process performed by the measurement apparatus 1. FIG. 8 is a flowchart illustrating a process of measuring communication data traffic. FIG. 9 is a flowchart illustrating a process of selecting a data group.

First, a process illustrated in FIG. 8 is described. At the start of a measurement process, a number i is set to 1 (S1201). The measurement unit 13 clears a counter for measuring data traffic (S1202). When the communication unit 11 receives a signal from the network tap 3, the communication unit 11 determines a transmission unit of the signal received from the network tap 3 and acquires data in the transmission units (S1203). The control unit 12 stores the data acquired in S1203 in the storage unit 14 (S1204). In S1204, time information about a time at which the communication unit 11 has acquired the data is also stored.

The measurement unit 13 determines whether the data acquired by the communication unit 11 is included in a group (Si) (S1205). For example, it is determined whether the data is included in the group (Si) by determining whether the data has been acquired in a predetermined time range. That is, the measurement unit 13 determines a group to which the data belongs on the basis of a time at which the communication unit 11 has acquired the data in S1203.

It is determined in S1205 that the data is included in the group (Si), the measurement unit 13 adds the traffic of the acquired data to the counter (S1211). When the number of transmission units is used as data traffic, the measurement unit 13 adds 1 to the counter in S1211. When the amount of information included in the acquired data is used as data traffic, the measurement unit 13 calculates the amount of information included in the acquired data in S1211 and adds a result of the calculation to the counter.

When it is determined in S1205 that the data is not included in the group (Si), the measurement unit 13 stores the value of the counter in the storage unit 14 and adds 1 to the number i (S1206).

The selection unit 15 determines whether the pieces of data traffic (V1 to Vn) in a predetermined number (n) of groups (S1 to Sn) have been stored in the storage unit 14 (S1208). The predetermined number (n) of groups (S1 to Sn) are hereinafter referred to as a processing unit (r). When it is determined that the pieces of data traffic (V1 to Vn) in the processing unit (r) have been stored, a data storage process is performed (S1209). When the processing of S1209 ends, the measurement process ends (S1210). When it is determined in S1208 that the pieces of data traffic (V1 to Vn) in the processing unit (r) have not been stored, the process returns to S1202.

Next, the data group selection process illustrated in FIG. 9 is described. This process is a process of determining a data storage range (Ss) in the storage unit 14 on the basis of the measured pieces of data traffic (V1 to Vn).

When the data group selection process is started (S1301), the selection unit 15 reads out the pieces of data traffic (V1 to Vn) in the groups (S1 to Sn) from the storage unit 14 (S1302). Subsequently, the selection unit 15 sets a value (p) (S1303). The value (p) is set on the basis of the read pieces of data traffic (V1 to Vn) and response information (tr) that is transmitted from the information processing apparatus 2 in response to the pieces of data traffic (V1 to Vn) transmitted to the information processing apparatus 2. For example, a result of addition of the sum of the pieces of data traffic or a value obtained by arranging values of the pieces of data traffic (V1 to Vn) each having a predetermined number of digits and an integer value obtained by converting a time (tr) at which the information processing apparatus 2 has received the pieces of data traffic (V1 to Vn) may be set as the value (p).

The selection unit 15 selects a data storage target group (Ss) from among the groups (S1 to Sn) on the basis of the value (p) set in S1303 (S1304). For example, the selection unit 15 selects the group (Ss) by performing hash computation using the value (p) set in S1303 or referring to a table prepared in advance. The selection of the group (Ss) is described in detail below.

The control unit 12 sets data included in the group (Ss) selected in S1304 to be "not overwritable" and data that is not included in the group (Ss) to be "overwritable" (S1305). The processing of S1305 can reduce the storage capacity of the storage unit 14.

After the processing of S1305, the data storage process ends (S1306).

Figure 10:
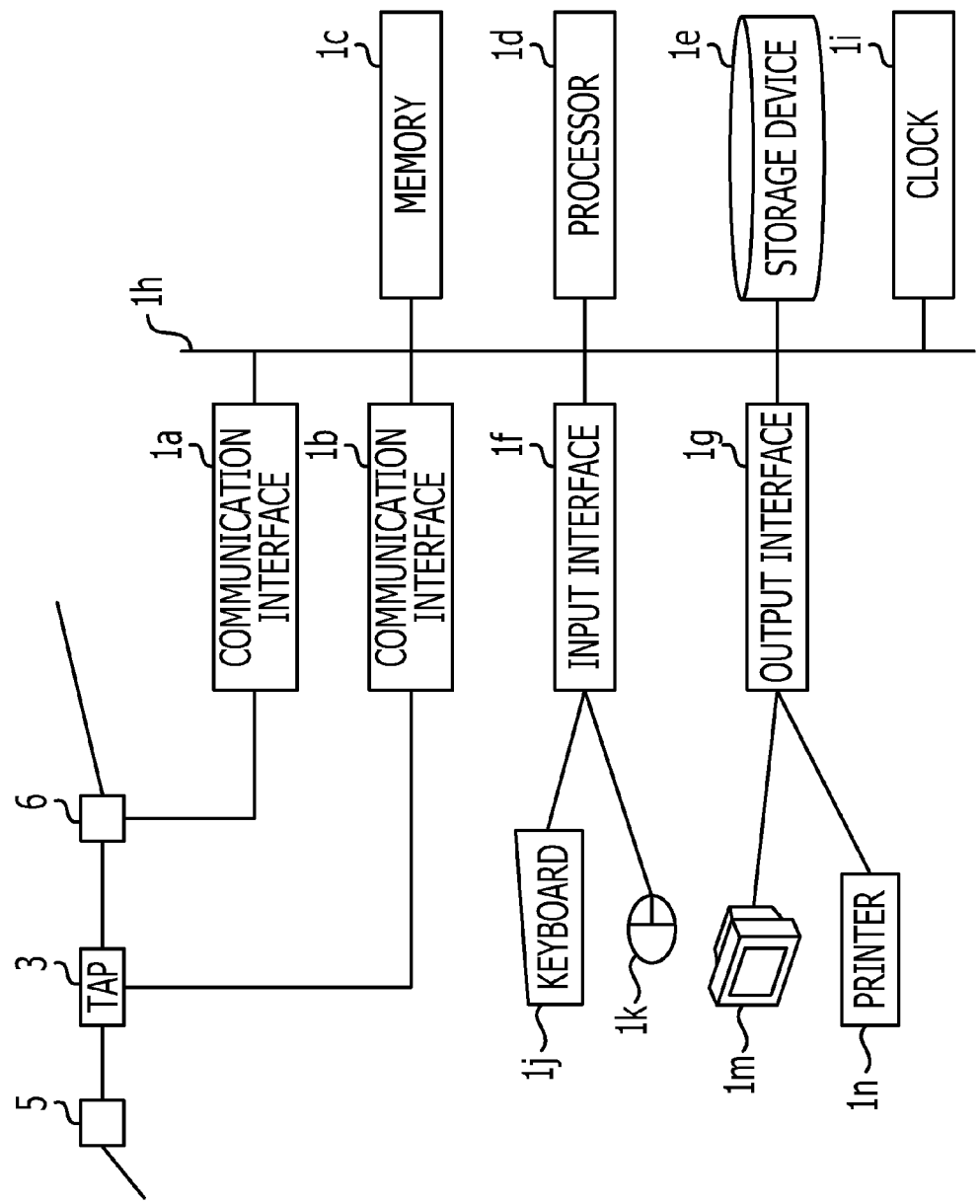
FIG. 10 is a diagram illustrating a hardware configuration of the first apparatus (the measurement apparatus).

FIG. 10 is a diagram illustrating the hardware configuration of the first apparatus 1 according to the above-described embodiment and the measurement apparatus 1 according to an embodiment. Communication interfaces 1a and 1b, a memory 1c, a processor 1d, a storage device 1e, an input interface 1f, an output interface 1g, a bus 1h, and the clock 1i are illustrated.

The memory 1c is, for example, a Random Access Memory (RAM), and has a function of temporarily storing data or a program under the control of the processor 1d. The processor 1d is, for example, a Central Processing Unit (CPU), and controls the measurement apparatus 1 in accordance with a program. The storage device 1e is, for example, a Hard Disk Drive (HDD), and data or a program can be written into or read out from the storage device 1e under the control of the processor 1d. For example, by storing an Operation System (OS) or a program such as application software in the storage device 1e, storing a program in the memory 1c as appropriate, and causing the processor to perform processing in accordance with the program stored in the memory 1c, the first apparatus 1 and the measurement apparatus 1 can execute the program.

The communication interface 1a is connected to the relay apparatus 6. The communication interface 1b is connected to the network tap 3. An input device is connected to the input interface 1f, and includes, for example, the keyboard 1j and the mouse 1k illustrated in FIG. 10. An output device is connected to the output interface 1g, and includes, for example, a monitor 1m and a printer 1n illustrated in FIG. 10. The input device and the output device illustrated in the drawing are not necessarily used. For example, a touch panel having an input function and an output function may be connected to the input interface 1f and the output interface 1g.

The clock 1i has a function of transmitting time information to each unit in the measurement apparatus 1 via the bus 1h.

The apparatus illustrated in FIG. 10 can perform processing of units illustrated in the functional block diagrams in FIGS. 1 and 5. For example, the processing of the communication unit 11 can be performed by causing the communication interface 1b to transmit a signal received from the network tap 3 to the processor 1d and causing the processor 1d to extract data from the received signal in transmission units and store the read data in the memory 1c. By causing the processor 1d to acquire time information from the clock 1i, a data extraction time can be also stored.

For example, the processing of the measurement unit 13 can be performed by causing the processor 1d to read out data from the memory 1c, measure the read data, and store a result (V1 to Vn) of the measurement in the memory 1c or the storage device 1e.

For example, the processing of the storage unit 14 can be performed by causing the memory 1c or the storage device 1e to store the result of measurement (V1 to Vn) and data acquired by the communication interface under the control of the processor 1d.

For example, the processing of the selection unit 15 can be performed by causing the processor 1d to read out the result of measurement (V1 to Vn) and a function included in the program from the memory 1c, substitute the result of measurement (V1 to Vn) into the read function, and store information about a result (Ss) of the substitution in the memory 1c. Alternatively, the processing of the selection unit 15 can be performed by storing a table in which each of groups (S1 to Sn) and the value (p) are associated with each other in the memory 1c and causing the processor 1d to refer to the table stored in the memory 1c and read out from the table information about the group (Ss) associated with the value (p) set on the basis of the result of measurement (V1 to Vn).

For example, the processing of the control unit 12 can be performed by reading out data from the memory 1c or the storage device 1e on the basis of the information about the group (Ss) read by the processor 1d and storing the read data in a different area in the memory 1c or the storage device 1e. Alternatively, the processing of the control unit 12 can be performed by causing the processor 1d to set a flag for data stored in the memory 1c or the storage device 1e on the basis of the information about the group (Ss) and delete data for which no flag is set.

For example, the processing of the communication unit 11 can be performed by causing the communication interface 1a to transmit a received signal to the processor 1d and to transmit data and the result of measurement (V1 to Vn) read out from the memory 1c or the storage device 1e by the processor 1d.

Figure 11:
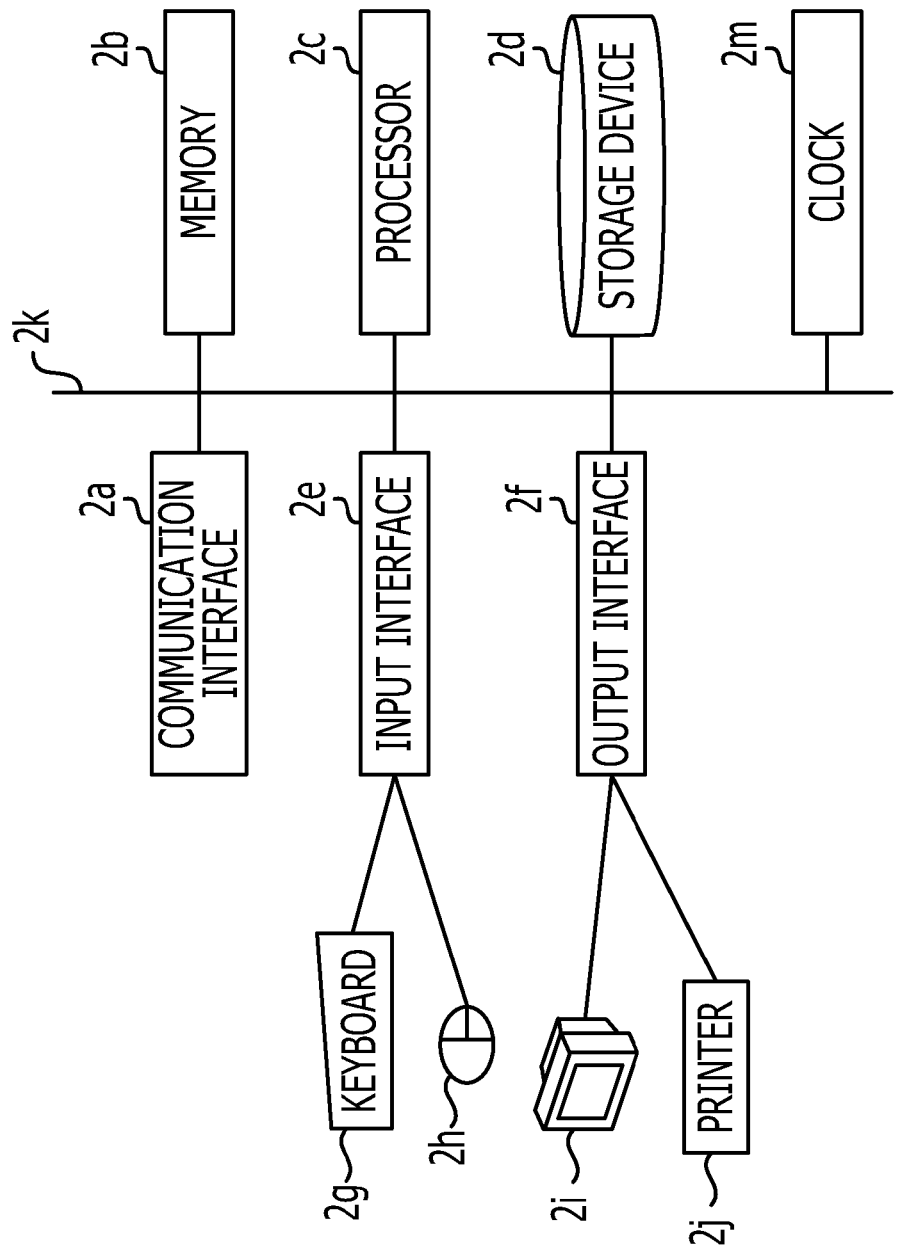
FIG. 11 is a diagram illustrating the hardware configuration of the second apparatus (a terminal apparatus).

FIG. 11 is a diagram illustrating the hardware configuration of the second apparatus 2 according to the above-described embodiment and the terminal apparatus 2 according to an embodiment. A communication interface 2a, a memory 2b, a processor 2c, a storage device 2d, an input interface 2e, an output interface 2f, a keyboard 2g, a mouse 2h, a monitor 2i, a printer 2j, a bus 2k, and a clock 2m are illustrated. Each piece of hardware has a function similar to that described with reference to FIG. 10.

For example, the processing of the communication unit 21 can be performed by transmitting the pieces of data traffic (V1 to Vn) and data included in the group (Ss) received by the communication interface 2a to the processor 2c.

For example, the processing of the verification unit 24 can be performed by causing the processor 2c to write the received pieces of data traffic (V1 to Vn) and the received data included in the group (Ss) into the memory 2b, read out the pieces of data traffic (V1 to Vn) from the memory 2b, select a group (Ss') on the basis of the read pieces of data traffic (V1 to Vn) and the receiving time (tr), read out information about the group (Ss) from the data in the group (Ss) written in the memory 2b, and compare the selected group (Ss') and the group (Ss) represented by the read information with each other. Alternatively, the processing of the verification unit 24 can be performed by causing the processor 2c to read out data included in the group (Ss) from the memory 2b, calculate the data traffic (Vs') of the data, select the data traffic (Vs) from among the pieces of data traffic (V1 to Vn) in the memory 2b, read out the data traffic (Vs) from the memory 2b, and compare the data traffic (Vs) and the calculated data traffic (Vs') with each other.

For example, the processing of the communication unit 21 can be performed by causing the processor 2c to control processing so that data received from the communication interface 2a or data processed by the processor 2c is transmitted to the output interface 2f, the output interface 2f outputs the data to a specified output device and the input interface 2e transmits a signal received by the input device to the processor 2c.

Figure 13:
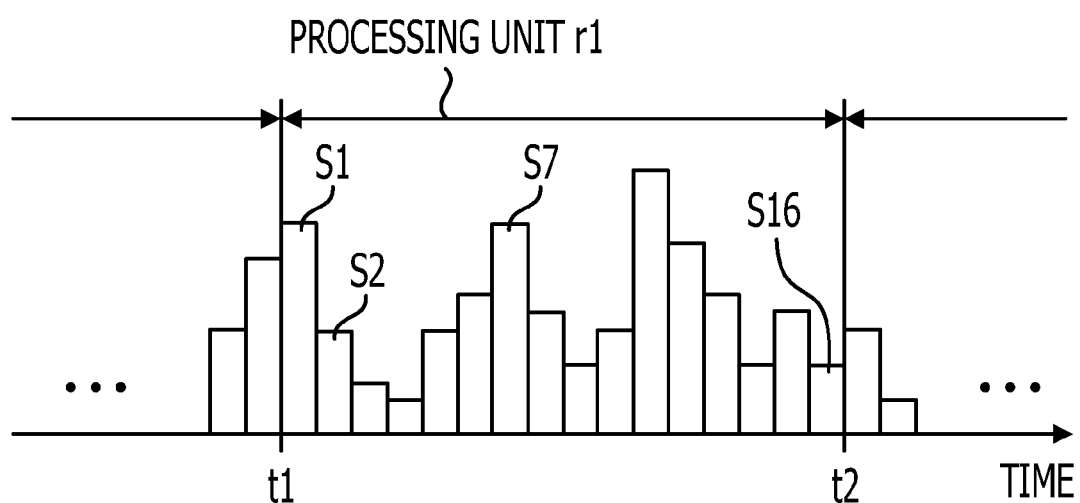
FIG. 13 is a diagram illustrating pieces of data traffic on a time-series basis.

FIGS. 12 and 13 are diagrams illustrating an example of the relationship among pieces of data traffic (V1 to V16) in groups (S1 to S16) in a processing unit (r) when n is set to 16. FIG. 12 is a diagram illustrating a storage example of the pieces of data traffic (V1 to V16) in the groups (S1 to S16). FIG. 13 is a diagram illustrating the pieces of data traffic (V1 to V16) in the group (S1 to S16) on a time-series basis.

In S1206, the group (Si) and the measured data traffic (Vi) are associated with each other and are then stored as illustrated in FIG. 12.

In FIG. 13, the measured pieces of data traffic (V1 to V16) in the groups (S1 to S16) are represented by bar graphs. The groups (S1 to S16) are set as the processing unit (r1), and the processing unit (r1) starts at a time t1 and ends a time t2.

Figure 14:
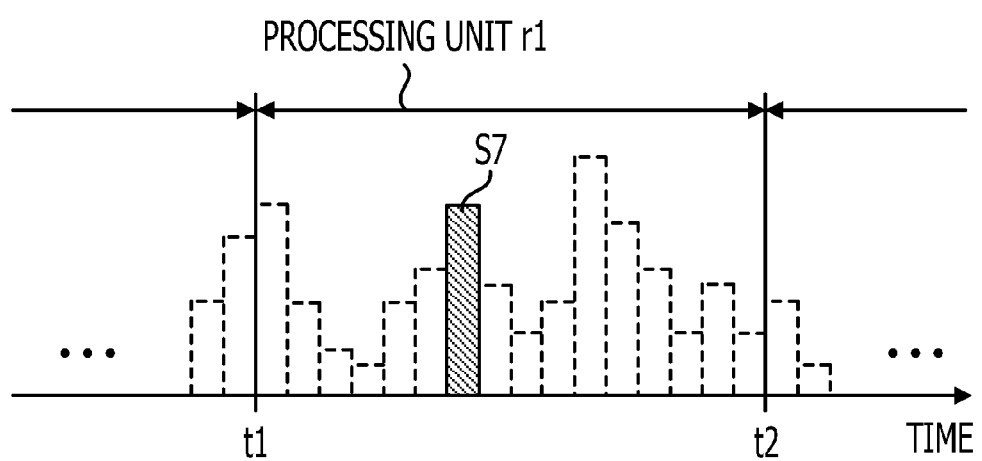
FIG. 14 is a diagram illustrating an example of data traffic selected from among the pieces of data traffic illustrated in FIG. 13.

For example, the selection unit 15 selects one of groups in the processing unit (r1) and sets data included in the selected group (Ss) to be "not overwritable" in the storage unit 14 so that the storage unit 14 does not delete the data included in the group (Ss) and continuously stores. When the selection unit 15 deletes data that is not included in the selected group (Ss), data traffic in each processing unit (r) stored in the storage unit 14 can be reduced. For example, when the selection unit 15 selects one (the group S7 illustrated in FIG. 13) of the groups (S1 to S16) on the basis of the pieces of data traffic (V1 to V16), the storage unit 14 continuously stores only data included in the group S7 represented by oblique lines in FIG. 14 and does not continuously store pieces of data in the groups S1 to S6 and the groups S8 to S16 included in the processing unit (r1).

The selection unit 15 selects the group (Ss), for which data protection is performed in the storage unit 14, on the basis of the data traffic (one of V1 to Vn) in each group (Si) in a single processing unit (r). More specifically, the selection unit 15 sets the value (p) on the basis of the data traffic (one of V1 to Vn) in each group (Si) in a processing unit (r) and the receiving time (tr) at which the second apparatus 2 (or the information processing apparatus 2) has received the pieces of data traffic (V1 to Vn) (in S1303) and determines the group (Ss), for which data protection is performed in the storage unit 14, on the basis of the set value (p) (in S1304). A method of selecting the group (Ss) from among the groups (S1 to Sn) included in the processing unit (r) is described.

In order to set the value (p), for example, the value of the receiving time (tr) is added to the sum of the pieces of data traffic (V1 to V16) in the groups (S1 to S16), a value obtained by arranging values of the pieces of data traffic (V1 to V16) in the groups (S1 to S16) each having a predetermined number of digits, or a value obtained by encrypting one of the above-described two values using a public key. These values used as the value (p) are described using the processing unit (r1).

The sum of the pieces of data traffic in the groups (S1 to S16) is obtained by V1+V2+V3+ . . . +V16. It is assumed that the maximum value of communication data traffic in each of the groups (S1 to S16) can be represented in Bmax bits. In order to store the sum of the pieces of data traffic (V1 to V16), Bmax+4 bits are needed.

Figure 15:
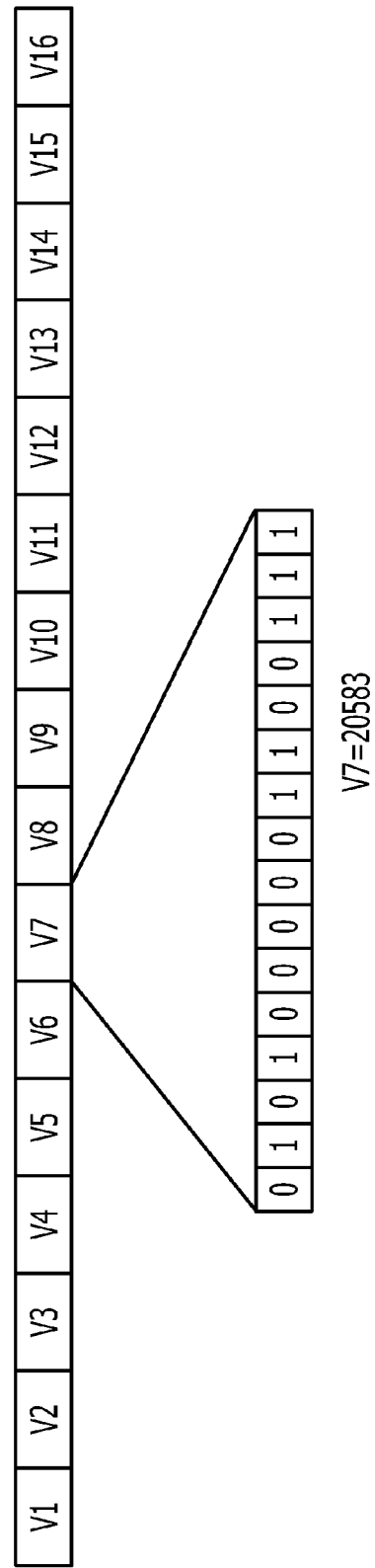
FIG. 15 is a diagram illustrating an example of a value obtaining by arranging values of pieces of data traffic each having a predetermined number of digits.

An example of a value obtained by arranging values of the pieces of data traffic (V1 to V16) in the groups (S1 to S16) each having a predetermined number of digits is illustrated in FIG. 15. When the maximum value of communication data traffic in each of the groups (S1 to S16) is represented in Bmax bits, Bmax-bit values of the pieces of data traffic (V1 to V16) in the groups (S1 to S16) are arranged. Referring to FIG. 15, the values of the pieces of data traffic (V1 to V16) each having Bmax digits are individually stored at positions represented by V1 to V16. For example, when the value of the data traffic V7 is "20583" in a decimal system, "0101000001100111" is stored at a position represented by V7. In order to store values used for setting processing performed by the selection unit 15, Bmax×16 bits are needed.

When the selection unit 15 is included in the measurement apparatus 1, the communication unit 11 acquires a public key from, for example, the terminal apparatus 2 via a network and the selection unit 15 encrypts a value to be user for setting processing performed by the selection unit 15 using the public key. In both cases where the pieces of data traffic (V1 to V16) in the groups (S1 to S16) are added and the values of the pieces of data traffic (V1 to V16) in the groups (S1 to S16) each having a predetermined number of digits are arranged, the number of bits required for storage of the encrypted value (p) is not changed. When the selection unit 15 is included in the second apparatus 2, the value is encrypted using a public key possessed by the second apparatus 2.

Examples of the method of selecting the group (Si) included in the processing unit (r) include a method using a hash function and a method using a table prepared in advance.

In the case of the method using a hash function, the selection unit 15 uses a hash function that returns a 4-bit value to represent one of the groups (S1 to S16) since sixteen groups (S1 to S16) are included in the processing unit (r1). That is, the selection unit 15 substitutes the value (p) set on the basis of the measured pieces of data traffic (V1 to V16) in a hash function and selects the group (Ss) represented by the value of the hash function.

In the case of the method using a table prepared in advance, for example, the table illustrated in FIG. 16 is used. In the table illustrated in FIG. 16, each of the groups (S1 to S16) included in the processing unit (r1) and the range of the value (p) are associated with each other. The selection unit 15 refers to this table and selects the group (Ss) associated with a range including the value (p).

The processing for selecting the group (Ss) performed by the selection unit 15 is not limited to the above-described examples. Any selection processing that can obtain the same result of selection (the group (Ss)) even when it is performed a plurality of times on the basis of the value (p) may be performed.

The measurement apparatus 1 selects the group (Ss), for which data protection is performed in the storage unit 14, after measuring pieces of data traffic in a plurality of groups (S1 to Sn) included in a processing unit (r). Accordingly, all pieces of data included in the processing unit (r) are stored in the storage unit 14 until the group (Ss) is selected. When the stored data traffic (Vs) in the group (Ss) is changed or tampered with, the change or the tampering is detected by performing comparison with the data traffic (Vs) stored in the storage unit 14. Therefore, the measurement apparatus 1 cannot change or tamper with data traffic in any one (Si) of the groups (S1 to Sn) in the processing unit (r) while avoiding detection by other apparatuses.

In order to prevent a situation in which a hash function used for the selection of the group (Ss) is analyzed and the pieces of data traffic (V1 to Vn) in the groups (S1 to S16) are tampered with so that the value of the hash function is not changed, appropriate hash analysis prevention is employed.

For example, the value (p) is encrypted using a public key acquired from a communicator (e.g., the terminal apparatus 2 illustrated in FIGS. 6 and 7) that is a measurement target and is then used for hash computation, and the public key is periodically updated. Even when the relationship between a value substituted in a hash function and the value of the hash function is analyzed, the relationship between the pieces of data traffic (V1 to Vn) in the groups (S1 to Sn) and the selected group (Ss) is initialized since the public key is updated.

It is assumed that a value obtained by arranging the values of the pieces of data traffic (V1 to Vn) in the groups (S1 to Sn) is used as the value (p). In order to tamper with the value (p), only the pieces of data traffic (V1 to Vn) with which the same hash function value and the same data traffic in the selected group (Ss) represented by the hash function value are obtained can be used. Accordingly, as compared with a case in which the sum of the pieces of data traffic (V1 to Vn) is used as the value (p), the difficulty in analyzing a hash function can be increased.

In a case in which the selection unit 15 refers to the table illustrated in FIG. 16 and selects the group (Ss), when the data traffic (Vs) in the selected group (Ss) is tampered with, the tampering is detected by comparing the tampered data traffic (Vs) with data stored in the storage unit 14. When a value (p') determined on the basis of tampered pieces of data traffic (V1' to Vn') is not included in the same range as that in which the value (p) determined on the basis of the pieces of data traffic (V1 to Vn) is included, the tampering is detected. When the sum of the pieces of data traffic (V1 to Vn) is used as the value (p), significant tampering of the pieces of data traffic (V1 to Vn) can be detected. Therefore, the case in which the table illustrated in FIG. 16 is used for the selection of the group (Ss) is effective when a charge on an as-used basis is employed.

In a measurement apparatus in the related art for measuring data traffic in communication performed by an information processing apparatus, the risk of mismeasurement of communication data traffic is not considered. For example, when another information processing apparatus pretending to be the information processing apparatus performs communication, data traffic in this communication is also measured. Furthermore, the measurement apparatus may measure data traffic larger than its actual value. According to embodiments, when an apparatus for measuring data traffic performs mismeasurement, for example, a change made to data traffic or tampering performed on the data traffic can be detected.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. A measurement system comprising:
    a first apparatus including a first processor, and a first storage device; and
    a second apparatus including a second processor, and
    wherein the first processor is configured to measure traffic of data communicated via a communication path in each of a plurality of time ranges, store the data communicated in each of the plurality of time ranges in the first storage device, and notify the second apparatus of the measured data traffic,
    wherein the second processor is configured to transmit information designating one of the plurality of time ranges to the first apparatus,
    wherein the first processor is configured to transmit the data communicated in a time range designated by the information to the second apparatus, and
    wherein the second processor is configured to remeasure traffic of the data transmitted from the first apparatus, and compare the remeasured data traffic and the measured data traffic notified by the first apparatus.

2. The measurement system according to claim 1, wherein the first processor measures the traffic of data communicated by a predetermined apparatus via the communication path in each of the plurality of time ranges.

3. The measurement system according to claim 1, wherein the first processor measures the traffic of data communicated by the second apparatus via the communication path in each of the plurality of time ranges.

4. A measurement apparatus comprising:
    a processor; and
    a storage device,
    wherein the processor is configured to:
        measure traffic of data communicated via a communication path in each of a plurality of time ranges,
        store the data communicated in each of the plurality of time ranges into the storage device,
        notify an information processing apparatus of the measured data traffic, and
        transmit the data stored in the storage device to the information processing apparatus in response to an instruction from the information processing apparatus, and
    wherein the information processing apparatus is configured to remeasure traffic of the data transmitted from the measurement apparatus, and compare the remeasured data traffic and the measured data traffic notified by the measurement apparatus.

5. A measurement method comprising:
    measuring, using a measurement apparatus, traffic of data communicated by an information processing apparatus via a communication path in each of a plurality of time ranges;
    storing the data communicated in each of the plurality of time ranges in a storage;
    transmitting measured data traffic to the information processing apparatus; and
    transmitting, after receiving the measured data traffic, information designating one of the plurality of time ranges from the information processing apparatus to the measurement apparatus,
    transmitting the data communicated in a time range designated by the information from the measurement apparatus to the information processing apparatus, and
    remeasuring the traffic of the data transmitted from the measurement apparatus, and comparing the remeasured data traffic and the measured data traffic transmitted from the measurement apparatus.

6. The measurement method according to claim 5, wherein pieces of the data communicated in the plurality of time ranges are stored in different storage locations, and
    a measurement during said one of the plurality of time ranges is verified using a corresponding of the pieces of data.

* * * * *